United States Patent [19]

Tanaka et al.

[11] Patent Number: 4,664,474

[45] Date of Patent: May 12, 1987

[54] OPTICAL FIBER AND PROCESS FOR PRODUCING THE SAME

[75] Inventors: Gotaro Tanaka; Kunio Fujiwara; Yasuo Matsuda, all of Kanagawa, Japan

[73] Assignee: Sumitomo Electric Industries, Ltd., Osaka, Japan

[21] Appl. No.: 606,096

[22] Filed: May 2, 1984

[30] Foreign Application Priority Data

May 2, 1983 [JP] Japan ................. 58-78036

[51] Int. Cl.⁴ ............................. G02B 6/22
[52] U.S. Cl. ................. 350/96.34; 350/96.30
[58] Field of Search ......... 350/96.30, 96.31, 96.34

[56] References Cited

U.S. PATENT DOCUMENTS

| | | | |
|---|---|---|---|
| 4,082,420 | 4/1978 | Shiraishi et al. | 350/96.31 |
| 4,165,152 | 8/1979 | Shiraishi et al. | 350/96.31 X |
| 4,210,386 | 7/1980 | Araujo et al. | 350/96.31 |
| 4,221,825 | 9/1980 | Guerder et al. | 350/96.34 X |
| 4,367,013 | 1/1983 | Guerder et al. | 350/96.34 |
| 4,439,007 | 3/1984 | Lazay et al. | 350/96.31 X |
| 4,439,008 | 3/1984 | Joormann | 350/96.31 |
| 4,441,788 | 4/1984 | Guerder et al. | 350/96.34 |
| 4,515,436 | 5/1985 | Howard et al. | 350/96.34 X |

*Primary Examiner*—William L. Sikes
*Assistant Examiner*—Akm E. Ullah
*Attorney, Agent, or Firm*—Sughrue, Mion, Zinn, Macpeak, and Seas

[57] ABSTRACT

An optical fiber comprising core glass having therearound a cladding comprising fluorine-containing quartz glass and a process for producing the same are disclosed. Said cladding is composed of an inner portion having a prescribed thickness and a constant fluorine content through its thickness and an outer portion having its fluorine content being gradually decreased in a radial direction so that its outermost surface has a fluorine content of about 0.7% by weight or less relative to $SiO_2$.

5 Claims, 8 Drawing Figures

OPTICAL FIBER AND PROCESS FOR PRODUCING THE SAME

FIELD OF THE INVENTION

This invention relates to an optical fiber and a process for producing the same and, more particularly, to an optical fiber having a cladding comprising fluorine-containing quartz glass around a core glass and to a process for producing the same.

BACKGROUND OF THE INVENTION

In optical fibers composed of quartz glass materials, in order to obtain fibers having a high numerical aperture (NA) by increasing a difference of refractive index ($\Delta n$) between a core and a cladding and to use pure $SiO_2$ glass having excellent radiation resistance as a core material, it is heretofore known to use quartz glass containing fluorine which decreases a refractive index of the quartz glass as a material for the cladding, as disclosed in, for example, U.S. Pat. Nos. 4,082,420 and 4,161,505. However, quartz glass containing a large amount of fluorine, though having a decreased refractive index by, for example, 0.5% than that of pure $SiO_2$ glass, is soft as reported by K. Rau et al., Topical Meeting on Optical Fiber Transmission (1977) and likely to be scratched and also inferior in terms of chemical resistance and the like.

In order to overcome the above-described disadvantage, it has been proposed that a fiber preform composed of a glass rod 1 for a core and a glass layer 3 for a cladding as shown in FIG. 1 is inserted in a quartz tube and united into one body, thereby to form a fiber preform having a quartz-jacketed structure 5 as shown in FIG. 2. However, this improved process has many problems such that bubbling frequently occurs from the interface between the cladding and the jacket upon uniting the fiber preform with the quartz tube; the fiber diameter tends to vary or breaking of the fiber occurs upon drawn the jacketed preform; and the like. Further, when a plurality of fibers prepared from the preform as shown in FIG. 1 are bundled up to constitute an image fiber, etc., a bubbling phenomenon is frequently observed in a collapsing step for uniting the fiber into a bundle, thus making it difficult to obtain satisfactory products.

SUMMARY OF THE INVENTION

Accordingly, an object of the present invention is to provide an optical fiber having a high refractive index and excellent radiation resistance.

Another object of the present invention is to provide a process for producing an optical fiber which lessens the troubles such as variation of the outer diameter, breakihg, bubbling, etc.

A further object of the present invention is to provide a process for producing an optical fiber which does not cause air bubbles during a collapsing step in the production of image fibers or light guides from a fiber bundle.

A still further object of the present invention is to provide a process for producing an optical fiber which makes it possible to produce image fibers, etc. free from lacks of picture elements or dark spots.

The above objects of the present invention can be accomplished by an optical fiber comprising core glass having therearound a cladding comprising fluorine-containing quartz glass, wherein said cladding consists of an inner portion having a prescribed thickness and having a constant fluorine content and an outer portion having its fluorine content gradually decreased in a radial direction toward its outer surface so that its outermost surface contains substantially no fluorine to up to 0.7% by weight of fluorine, and a process for producing the same.

DETAILED DESCRIPTION OF THE INVENTION

Examples of dopants which can be used for the core glass according to the present invention are $GeO_2$, $P_2O_5$, $Al_2O_3$ and $TiO_2$, preferably $GeO_2$. For example, in a L- step-index type fiber, $GeO_2$ can be generally added in the range of from about 15 wt % to about 40 wt %, based on the weight of core glass. In an embodiment hereinafter described in Example 3, $GeO_2$ is present in an amount of about 18 wt % in a peripheral portion of the core glass rod and in an amount of 36 wt % in a center portion of the core glass rod, based on the weight of core glass rod.

The inner portion of the cladding generally contain fluorine in an amount of about 1.5 wt % to about 4 wt % based on the weight of quartz glass The thickness proportion ($t/t_0$) between the inner portion ($t_0$) of cladding where the fluorine content is constant and the outer portion (t) of cladding where the fluorine content gradually decreases in a radial direction is generally in the range of 0.04 to 0.2.

The thickness of cladding and jacket, if any, relative to the core diameter can be varied widely. In a fiber comprising a core and a cladding, the thickness of cladding is generally in the range of from 1/20 to ½ times the core diameter. The thickness of jacket can be typically in the range of about 1 to about 3 times the thickness of the cladding, but the present invention is not limited to the above proportions.

In a glass rod comprising a core and cladding, the thickness of the cladding to where the fluorine content is constant is preferably 0.05 to 0.5 times based on the core diameter, and $t/t_0$ is preferably 0.04 to 0.2. For example, when the core has a diameter of 25 mm and the inner cladding ($t_0$) has a thickness of 5 mm, the outer portion of the cladding (t) is preferably 0.2 to 1.25 mm. The difference in the refractive index ($\Delta n$) between the inner portion of the cladding and the outer portion of cladding is preferably about 0.4% to about 1.2%. For example, when the outer portion of the cladding has a thickness of 0.2 mm, the difference in the refractive index ($\Delta n$) is preferably about 0.4% or more, and when the outer portion of the cladding is about 1.2 mm, the difference ($\Delta n$) is preferably about 1.2%.

The optical fiber prepared by drawing the glass rod generally has a diameter of about 100 μm to about 500 μm, typically 125 μm, 140 μm, 150 μm or 280 μm as standards.

The present invention will be illustrated in greater detail with reference to the accompanying drawings.

Figure 1:
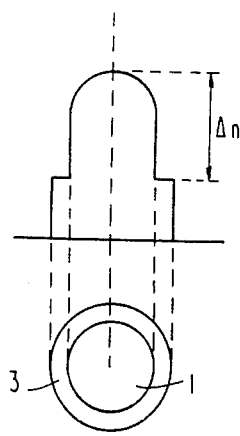
FIGS. 1 and 2 each shows a structure of a conventional fiber preform with a distribution of the refractive index thereof.
Figure 2:
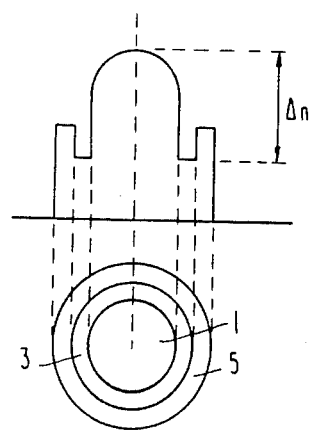
Figure 3:
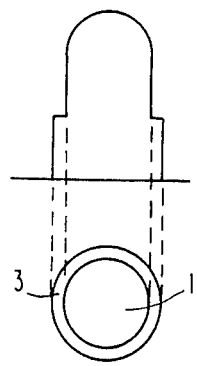
FIGS. 3 and 4 show an embodiment of the present invention, in which a fiber preform for producing an optical fiber is illustrated with a distribution of the refractive index thereof.
Figure 4:
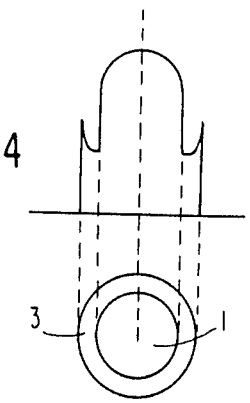
Figure 5:
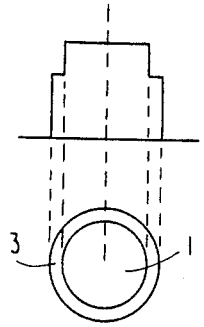
FIGS. 5 and 6 show another embodiment of the present invention, in which a fiber preform for producing an optical fiber is illustrated with a distribution of the refractive index thereof.
Figure 6:
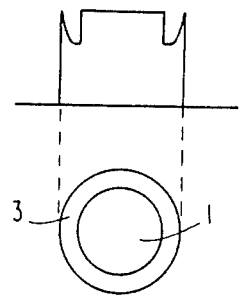

FIGS. 3 through 8 show embodiments according to the present invention illustrating a process for producing a fiber of the invention. In FIGS. 3 and 4, $GeO_2$-containing $SiO_2$ glass is used as a glass rod 1 for a core aiming at production of a high NA fiber or a high luminance image fiber. In FIGS. 5 and 6, high purity $SiO_2$ glass is used as a glass rod 1 for a core aiming at production of a radiation resistant fiber or a radiation resistant image fiber.

In manufacturing fiber preforms according to the present invention, a fluorine-doped $SiO_2$ glass layer 3 is formed around the glass rod 1 as a cladding as shown in FIGS. 3 and 5. Formation of the fluorine-doped $SiO_2$ glass layer can be carried out by, for example, introducing a fluorine-containing gas, e.g., $CCl_2F_2$ or $CF_4$, $SiCl_4$ and $O_2$ to high frequency plasma flame to produce fluorine-doped glass in the plasma flame, blowing the fluorine-doped glass in a molten state onto the periphery of the rotating and reciprocating glass rod 1 to accumulate a glass film and repeating the accumulation until the glass layer thus formed reaches a prescribed thickness (FIGS. 3 and 5). In this step, a proportion of the fluorine-containing gas to the other starting gases is maintained substantially constant so as to give a substantially constant fluorine content to the accumulated glass layer throughout its thickness. For the sake of convenience, this portion of the glass layer 3 which has a constant fluorine content through its thickness will be hereinafter referred to as "inner portion".

Figure 7:
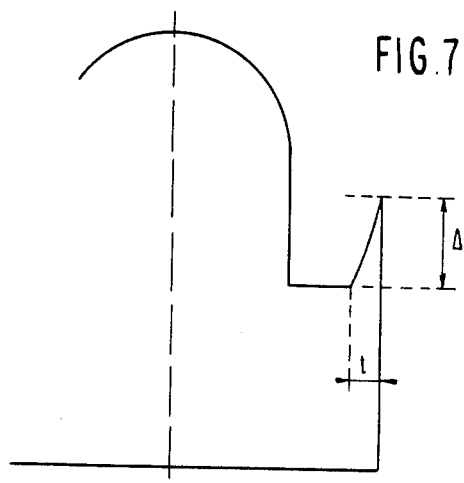
FIG. 7 is a partial enlargement of FIG. 4.
Figure 8:
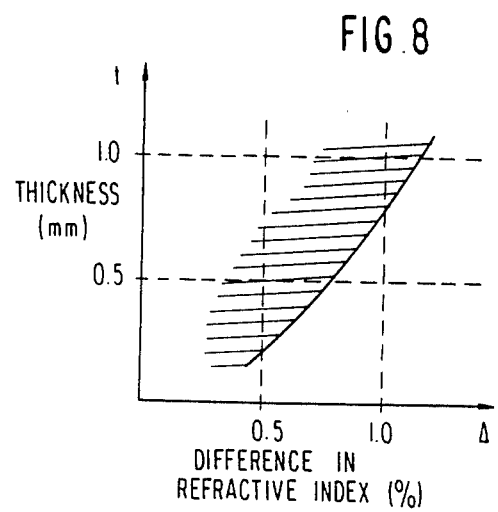
FIG. 8 is a graph showing a preferred relationship between a difference in refractive index and thickness of an outer portion of a cladding according to the present invention.

Then, the gaseous phase fluorine concentration to be introduced to plasma flame is gradually reduced with the passage of time while continuing accumulation of glass film so that the composition of the thus accumulated glass film is gradually changed in such a manner that the final fluorine content in the outermost surface becomes almost zero. For the sake of convenience, this portion of the glass layer 3 having a gradually decreased fluorine content in its radial direction will be referred to as "outer portion". Thus, by decreasing the fluorine content in the outer portion of the glass layer 3 to a final content of zero in the outermost surface, the refractive index of the fiber preform thus produced and also fibers obtained therefrom shows an uneven distribution as shown in FIGS. 4 and 6. If the rate of decreasing the fluorine content in the outer portion of the glass layer is too high, bubbles are likely to generate on the surface of the preform during the formation of the glass layer for cladding. In this connection, FIGS. 7 and 8 show a relationship between a glass thickness (t) and a difference of refractive index ($\Delta$) in the outer portion wherein a fluorine content is changed. In order to avoid the above-described generation of bubbles, a preferred range of this relationship is indicated by slant lines in FIG. 8.

The resulting fiber preform having the fluorine content in the outer portion of the glass cladding being varied is then drawn to obtain a desired fiber without causing problems such as variation of diameter, breaking etc. Further, when the above fiber preform is inserted in a quartz tube and united therewith into a jacketed structure, bubbles are not produced between the cladding and the jacket, and the preform having the jacketed structure can be drawn to form fibers without substantially causing troubles such as variation of diameter, breaking etc. Furthermore, when a plurality of the fibers prepared from the above preforms are bundled up to constitute image fibers, etc., air bubbles are not formed during the collapsing step and satisfactory products can be obtained.

It is thought that the prevention of production of bubbles in the cladding-jacket interface according to the present invention results from the following mechanism. That is, fluorine-doped quartz glass has a lower viscosity and melts at a lower temperature as compared with quartz glass. Therefore, in the case of melting both the glass highly doped with fluorine and quartz glass under a high temperature condition to meet-fusing the boundary surface, it is necessary to maintain a temperature at which both of them are co-melting, i.e., about 1600° C. In this situation, though the fluorine-doped glass per se has a considerably reduced viscosity and is in a molten state to a high extent, $SiF_4$, an easily vaporable component, is vaporized to give a high vapor pressure and comes to be present between the two phases. To the contrary, according to the present invention wherein the composition of the glass cladding is varied by degrees until it becomes near to that of quartz glass in its outermost surface which is to be melted together with the quartz glass tube, the vapor pressure of $SiF_4$ is supposed to be suppressed so that no gas be present in the interface, thus preventing formation of bubbles.

The present invention has been described for the embodiment where substantially no fluorine is present in the outermost surface of the cladding, but it is to be understood that the object of the present invention can be achieved by decreasing the fluorine content to about 0.7% by weight or below, and the refractive index ratio of 0.2% or more with respect to $SiO_2$. Also, in another embodiment, an additional pure silica layer can be provided over the outermost layer of the cladding having no fluorine content. These embodiments are also within the scope of this invention.

The present invention will now be illustrated in greater detail by way of the following test examples.

EXAMPLE 1

Into high pressure plasma flame (output power 3.4 MHz, 6 kV, 2.5 A) were introduced $CCl_2F_2$ and $SiCl_4$ at rates of 300 cc/min and 400 cc/min, respectively, and the flame flow was directed to a rotating and reciprocating starting quartz glass rod for a core having a diameter of 25 mm and a length of 200 mm, thereby to form a glass layer around the periphery of the rod. At the point when the diameter of the glass layer thus formed reached 35 mm, the rates of introducing $CCl_2F_2$ and $SiCl_4$ were gradually reduced by 10 cc/min and 8 cc/min, respectively, each time the rod reciprocated. Finally, the rate of introducing $CCl_2F_2$ became 0, and that of $SiCl_4$ was decreased to 160 cc/min. The thickness of layer where the fluorine content gradually decreased was 1 mm. The thus obtained core having therearound an accumulated glass layer as a cladding was drawn in a drawing furnace set at about 2,000° C. into a fiber having an outer diameter of 140 μm. The resulting fiber showed a variation of outer diameter to almost within ±0.5 μm. The fiber (140 μmϕ) was cut into a length of 30 cm, and 5,000 cut fibers were bundled up. The fiber bundle was inserted in a quartz tube and then united therewith by heating the outside of the quartz tube by use of an H$_2$/O$_2$ burner to prepare a united bundle (preform) for an image fiber. The resulting preform had an almost transparent appearance substantially free from incorporation of bubbles. When this preform was drawn so as to have an outer diameter of 3 mm to form an image fiber, a satisfactory image fiber substantially free from lacks of picture elements could be produced.

EXAMPLE 2

The core-cladding structure as obtained in Example 1 was drawn so as to have an outer diameter of 7.5 mm and inserted into a quartz tube having an outer diameter of 15 mm and an inner diameter of 10 mm. The quartz glass tube was heated by an H$_2$/O$_2$ burner for uniting thereby obtaining a transparent core-cladding-jacket structure entirely free from bubbles. The resulting structure was drawn in a drawing furnace set at a temperature of about 2,000° C. to obtain an optical fiber having an outer diameter of 250 μm. The resulting optical fiber showed a variation of diameter of within ±1 μm and a difference in refractive index between the core and the cladding (Δn) of 0.9% and was excellent in radiation resistance, strength and weather resistance.

EXAMPLE 3

An image fiber was prepared in the same manner as in Example 1 except for using, as a core glass, a GeO$_2$-containing glass rod having an outer diameter of 25 mm and a difference of refractive index of 2% from that of quartz glass in its central portion. The difference of refractive index (Δn) between the core and the cladding of the resulting image fiber was about 3%, and the image fiber gave an extremely bright image without any lack of picture elements, dark spots, etc.

While the present invention has been described in detail and with reference to specific embodiments thereof, it will be apparent to one skilled in the art that various changes and modifications can be made therein without departing from the spirit and scope thereof.

What is claimed is:

1. An optical fiber comprising core glass having therearound a cladding comprising fluorine-containing quartz glass, wherein said cladding is composed of an inner portion having a constant fluorine content through the thickness of the inner portion and an outer portion having a fluorine content which gradually decreases in a radial direction so that the outermost surface of the outer portion has a fluorine content of up to 0.5% by weight relative to SiO$_2$.

2. An optical fiber according to claim 1, wherein the fluorine content of the inner portion is about 1.5 to about 4% based on the weight of the quartz glass.

3. An optical fiber according to claim 1, wherein the thickness of the inner portion is 0.05 to 0.5 times the core diameter.

4. An optical fiber according to claim 4, wherein the thickness of the inner portion is 0.05 to 0.5 times the core diameter.

5. An optical fiber according to claim 1, wherein the ratio of the thickness of the outer portion of the cladding to the thickness of the inner portion of the cladding is from 0.04 to 0.2.

* * * * *